(12) United States Patent
Senatori

(10) Patent No.: US 10,317,951 B2
(45) Date of Patent: Jun. 11, 2019

(54) HINGE MECHANISM FOR A COMPUTING DEVICE

(71) Applicant: HEWLETT-PACKARD DEVELOPMENT COMPANY, L.P., Houston, TX (US)

(72) Inventor: Mark Senatori, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,224

(22) PCT Filed: Nov. 12, 2015

(86) PCT No.: PCT/US2015/060380
§ 371 (c)(1),
(2) Date: Jan. 29, 2018

(87) PCT Pub. No.: WO2017/082910
PCT Pub. Date: May 18, 2017

(65) Prior Publication Data
US 2018/0224900 A1    Aug. 9, 2018

(51) Int. Cl.
*H05K 5/00*  (2006.01)
*G06F 1/16*  (2006.01)

(52) U.S. Cl.
CPC .......... *G06F 1/1681* (2013.01); *G06F 1/1607* (2013.01); *G06F 1/1616* (2013.01); *E05Y 2900/606* (2013.01)

(58) Field of Classification Search
CPC ....................................................... H05K 5/00
See application file for complete search history.

(56) References Cited

U.S. PATENT DOCUMENTS

| | | |
|---|---|---|
| 5,666,694 A | 9/1997 | Slow et al. |
| 7,637,745 B1 | 12/2009 | Dai et al. |
| 7,886,903 B1 | 2/2011 | Wurzelbacher, Jr. et al. |
| 8,310,844 B2 | 11/2012 | Hashimoto et al. |
| 2001/0009499 A1 | 7/2001 | Carlson |
| 2004/0125552 A1 | 7/2004 | Song |
| 2007/0206349 A1 | 9/2007 | Jacobs |
| 2009/0147458 A1 | 6/2009 | Wang |
| 2012/0099267 A1 | 4/2012 | Ahn et al. |
| 2014/0168878 A1* | 6/2014 | Jheng ............... G06F 1/1681 361/679.27 |
| 2015/0092335 A1 | 4/2015 | Patrick et al. |
| 2015/0120980 A1 | 4/2015 | Kim |

FOREIGN PATENT DOCUMENTS

WO    WO-2015167451 A1    11/2015

* cited by examiner

*Primary Examiner* — Jerry Wu
(74) *Attorney, Agent, or Firm* — HPI Patent Department

(57) ABSTRACT

Examples disclosed herein provide a hinge mechanism to couple housings of a computing device. As an example, the hinge mechanism includes a first guide rail fixed to a first housing of the computing device, a second guide rail fixed to a second housing of the computing device, and an intermediate guide rail to connect the first and second guide rails to each other. As an example, the hinge mechanism includes clamping brackets to hold the first, second, and immediate guide rails together and apply rotational friction to the hinge mechanism so that the first and second housings can be positioned at various angles with respect to each other.

11 Claims, 5 Drawing Sheets

HINGE MECHANISM FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Many form factors exist for notebook computers. A common form factor includes hinges that connect the two members of the clamshell-type design at the common end. A challenge faced by manufacturers of notebook computers is allowing for clearance of the hinges or other moving parts as the notebook computer is opened and closed, without having to give up much space from the base member or display member to accommodate the hinges.

Examples disclosed herein provide a hinge mechanism for a computing device, such as a notebook computer, with a virtual pivot axis, which allows for the hinge mechanism to be concealed within the base member of the notebook computer, and then emerge when the notebook computer is opened. The hinge mechanism may allow for the base member and the display member of the notebook computer to be mounted flush against each other, without the need for large gaps or cuts in adjacent surfaces of the members to accommodate the hinge mechanism.

Figure 1:
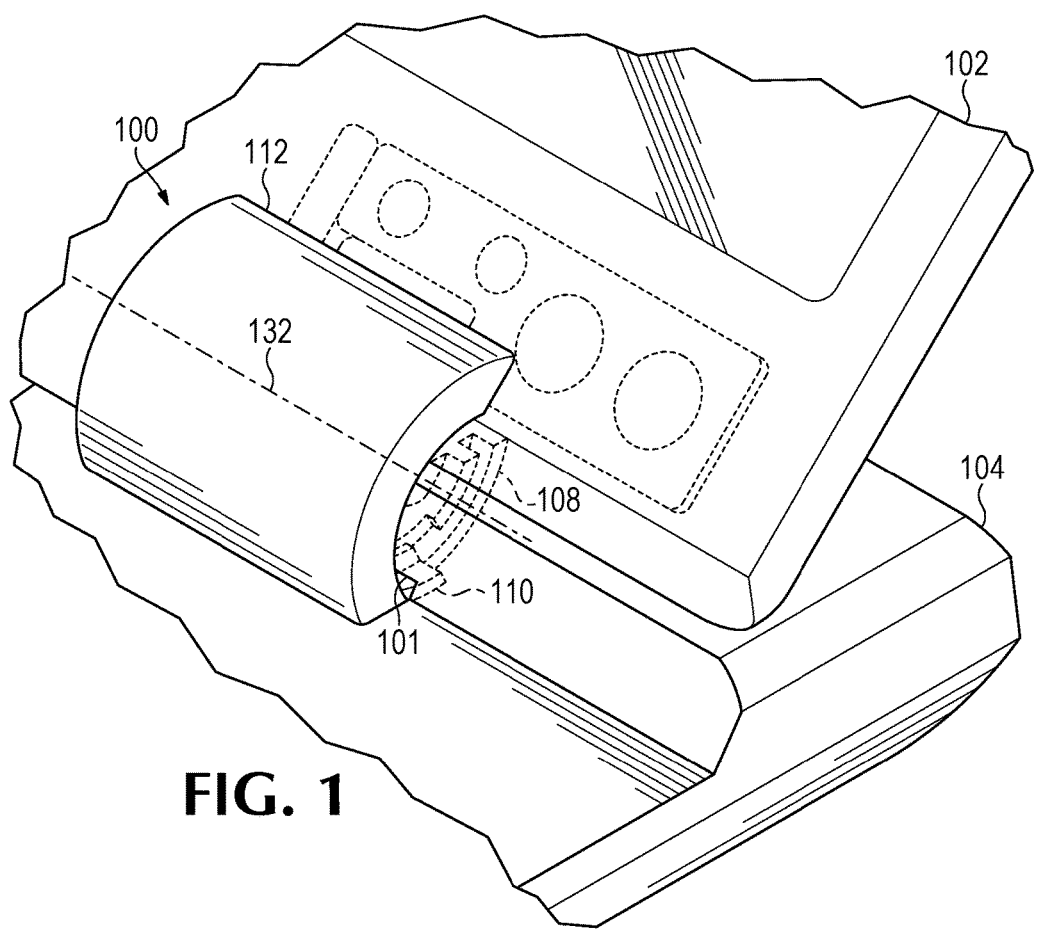
FIG. 1 illustrates a hinge mechanism of a computing device, according to an example.

With reference to the figures, FIG. 1 illustrates a hinge mechanism 100 of a computing device, such as a notebook computer, according to an example. The computing device includes a base member 104 and a display member 102 that may be joined together via the hinge mechanism 100. As an example, the base member 104 includes an area for user input, such as a touchpad and a keyboard. The display member 102 includes a display screen for viewing the video output of the computing device, and may include input means for operation by a user, such as a touchscreen (e.g., the display screen may be the touchscreen). Although only one hinge mechanism 100 is illustrated, the computing device may include any number of similar hinge mechanisms 100 along the common end shared by the display member 102 and base member 104.

Referring to FIG. 1, the hinge mechanism 100 may include a hinge cap 112 to cover the components of the hinge mechanism 100, as will be further described. In addition, the hinge cap 112 may contain any electrical cables that have to pass through the hinge mechanism 100. As an example, the hinge cap 112 can be attached to either the display member 102 or the base member 104, or can float between the two members 102, 104. In the floating mode, the start and end points of the hinge cap 112 may be controlled by the angular positions of the display member 102 and/or base member 104. As illustrated, the hinge mechanism 100 has a virtual pivot axis 132 outside of the computing device that moves in a rotary motion. As will be further described, this virtual pivot axis 132 allows the hinge mechanism 100 to be hidden with the base member 104 of the computing device. For example, the base member 104 includes an opening 101 for accommodating and concealing the hinge mechanism 100 when the notebook computer is closed.

Figure 2:
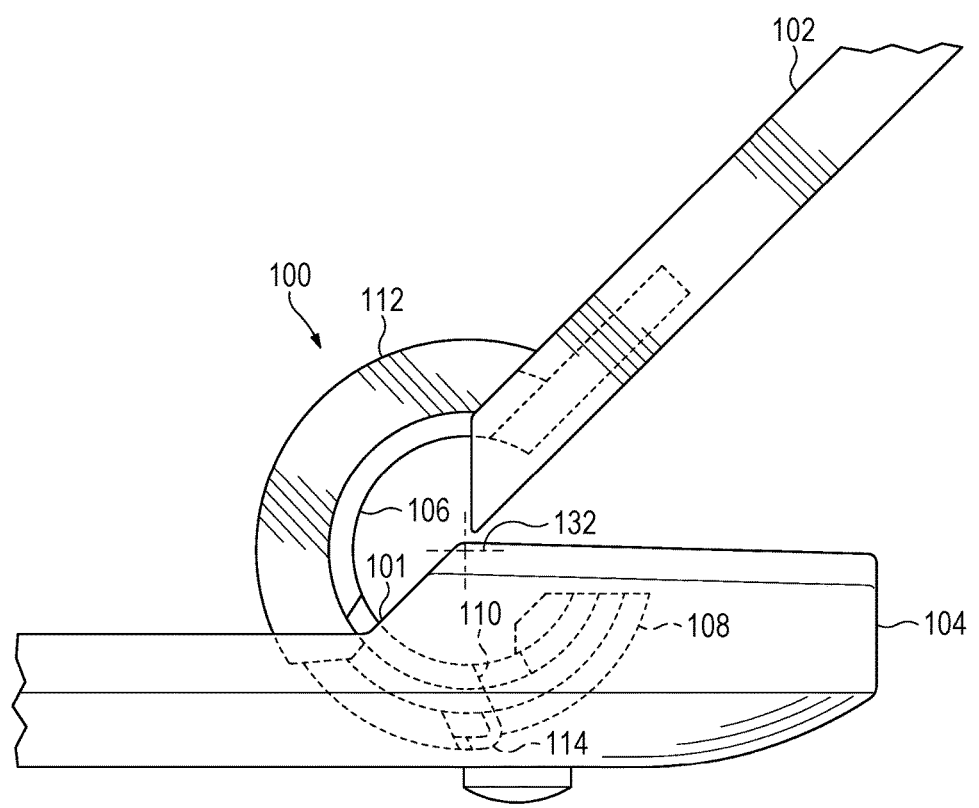
FIG. 2 illustrates various components of the hinge mechanism, according to an example.

FIG. 2 illustrates various components of the hinge mechanism 100, according to an example. The hinge mechanism 100 includes a number of telescoping concentric guide rails that allows the display panel 102 to rotate to an open angle that is larger than single guide rail could allow. As illustrated, the hinge mechanism 100 generally includes a first guide rail 106 fixed to a first housing of the computing device 100, such as the display member 102, and a second guide rail 108 fixed to a second housing of the computing device, such as the base member 104. Between the first and second guide rails 106, 108 is an intermediate guide rail 110 to connect the first and second guide rails 106, 108 to each other. The intermediate guide rail 110 splits the open angle of the other two guide rails 106, 108 and floats between the two. Further, as the notebook computer is opened and closed, the first guide rail 106 and the second guide rail 108 will pass each other, with only the intermediate guide rail 110 connecting them.

As will be further described, the hinge mechanism 100 may incorporate hard stops features that prevent over rotation of the guide rails 106, 108, 110. As an example, the hinge mechanism may include additional intermediate guide rails to provide additional support for the hinge mechanism 100 or to cover larger open angles. As an example, the guide rails 106, 108, 110 are held together by clamping brackets 114, which also applies rotational friction to the hinge mechanism 100, so the display member 102 can be positioned at any angle. As illustrated, the hinge cap 112 covers the first, second, and intermediate guide rails 106, 108, 110, for example, to conceal the inner workings of the hinge mechanism 100.

Figure 3A:
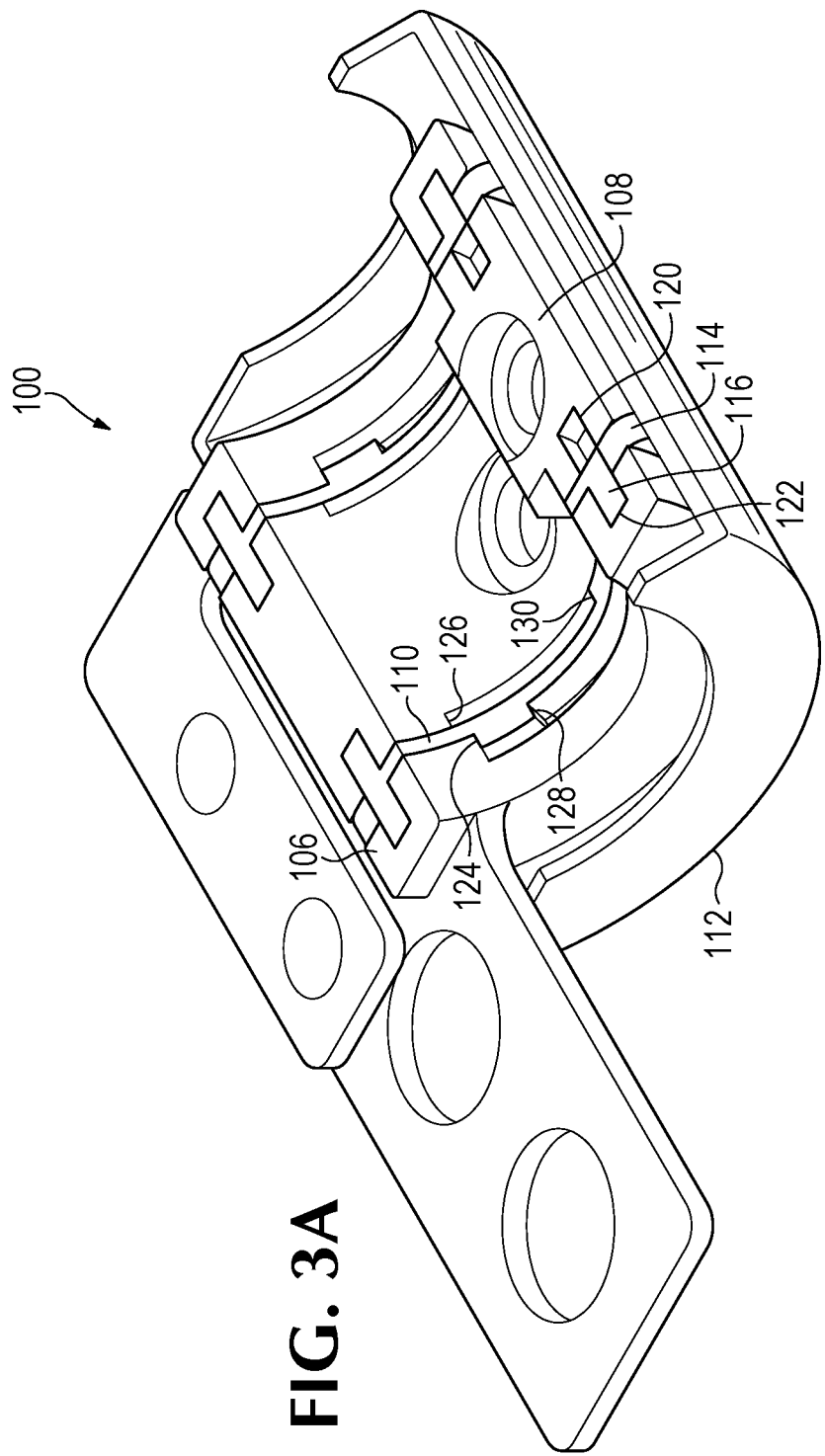
FIGS. 3A-C illustrate various views of the hinge mechanism, according to an example.
Figure 3B:
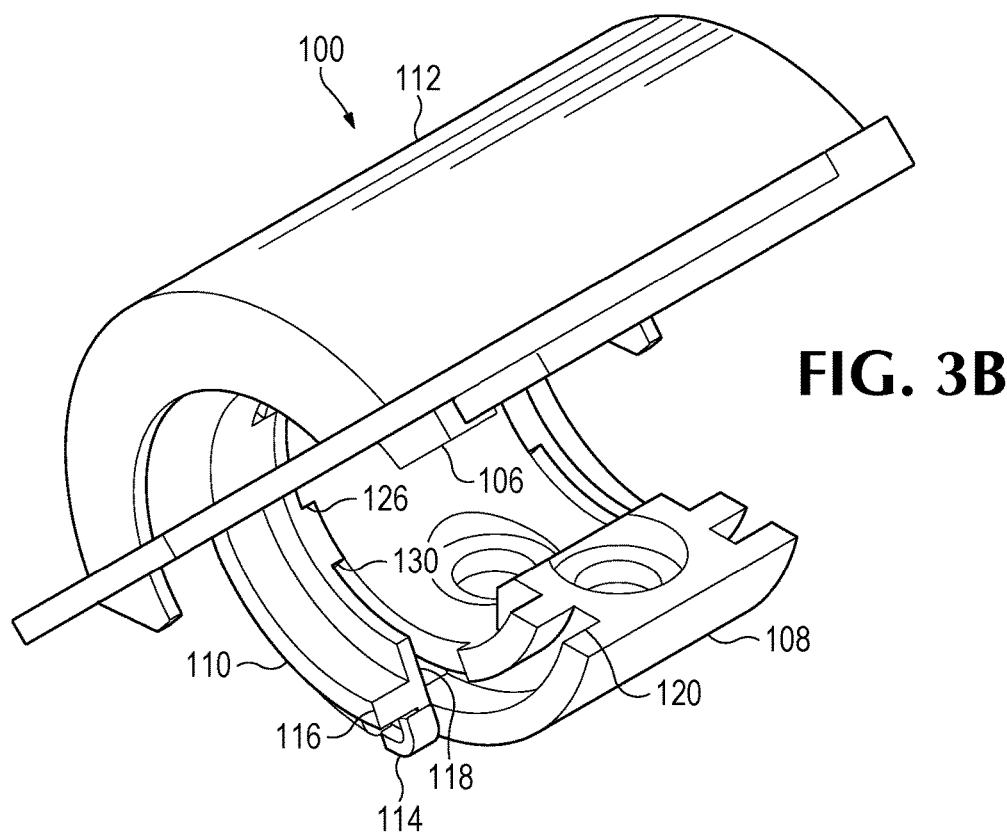
Figure 3C:
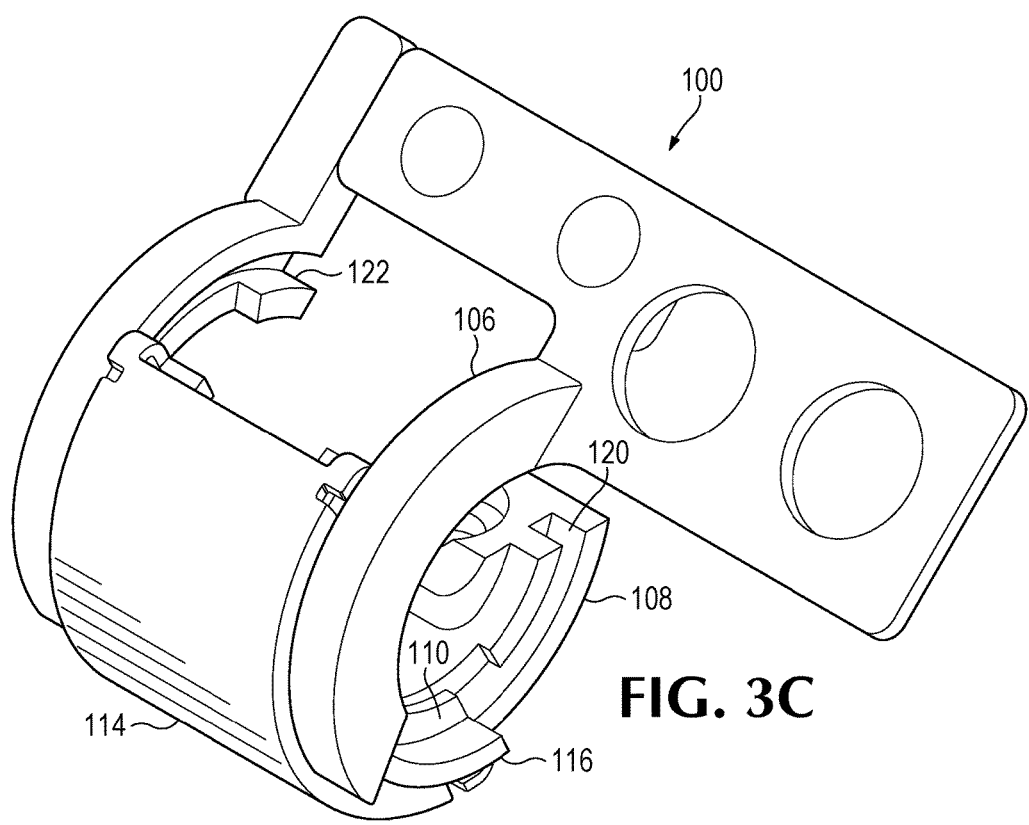

FIGS. 3A-C illustrate various views of the hinge mechanism 100, according to an example. As illustrated, the first and second guide rails 106, 108 are concentric by sharing the same axis (e.g., see virtual pivot axis 132 in FIGS. 1 and 2), and fit with the intermediate guide rail 110 and slide one with another. As will be further described, the intermediate guide rail 110 splits the open angle of the first and second guide rails 106, 108, and floats between the two guide rails 106, 108, with hard stop features that prevents over rotation of the two guide rails 106, 108.

As an example, in order for the first and second guide rails 106, 108 to fit with the intermediate guide rail 110, the guide rails 106, 108, 110 may include various features. As an example, protrusions of one guide rail may fit into a recess in an opposing guide rail. Referring to FIGS. 3A-B, protrusion 116 of the intermediate guide rail 110 may fit into recess 122 of the first guide rail 106, and protrusions 118 may fit into recess 120 of the second guide rail 108. Although only one side of the guide rails 106, 108, 110 are described with the protrusions and recesses, similar protrusions and recesses may be found on the other side of the guide rails 106, 108, 110 as well, as illustrated. Although the protrusions and recesses illustrated are rectangular in shape, the protrusions and recesses could be angled features and form more of a dove tail fit between two guide rails.

As mentioned above, the hinge mechanism 100 may incorporate hard stops features that prevent over rotation of the guide rails 106, 108, 110. For example, referring to FIGS. 3A-B, in order to prevent over rotation, the intermediate guide rail 110 may include notches 128, 130 to come into contact with another notch of an opposing guide rail, such as with notches of the first and/or second guide rail 106, 108. Referring to FIG. 3A, the hinge mechanism 100 is positioned in a closed position, where the computing device illustrated in FIG. 1 is in a closed position and the hinge mechanism is concealed within the base member 104 of the computing device, for example, via opening 101. As illustrated, notch 128 may come in contact with notch 124 of the first guide rail 106, and notch 130 may come in contact with a notch of the second guide rail (not illustrated). As a result, the hinge mechanism cannot be rotated any further as the computing device is placed in the closed position.

Referring to FIG. 3B, the hinge mechanism 100 is in an opened position, for example, as illustrated in FIGS. 1-2. In order to limit how far the display member 102 is opened, the notches described above may also be utilized. For example, once notch 130 of the intermediate guide rail 110 comes in contact with notch 126 of the second guide rail 108, and notch 128 of the intermediate guide rail 110 comes in contact with notch 124 of the first guide rail 106 (not illustrated), the display member 102 may not be rotated open any further.

Referring to FIG. 3C, the hinge cap 112 of the hinge mechanism 100 is removed in order to reveal the clamping bracket 114. As mentioned above, the clamping bracket 114 holds the guide rails 106, 108, 110 together, and also applies rotational friction to the hinge mechanism 100, so the display member 102 can be positioned at any angle. For example, the the clamping bracket 114 may provide a level of resistance to a torque provided when opening or closing the display member 102. As an example, the tension provided by the clamping bracket 114, to hold the guide rails 106, 108, 110 together, may be at a certain level in order to provide the sufficient friction so the display member 102 can be positioned at any angle without falling backwards while the computing device is being used.

As an example, there may be a small assembly gap between the guide rails 106, 108, 110 that contain either grease or a viscous fluid to control the feel of the guide rails 106, 108, 110 as they slide together and prevent material wear. To control this gap and reduce slop in the hinge mechanism 100, one or more of the guide rails 106, 108, 110 may be made slightly off concentricity as compared to the other guide rails 106, 108, 110, so that there is an interference fit. As an example, the guide rails made slightly off concentricity may be made of slightly more forgiving material, allowing it to deform slightly, taking up the gap tolerance between the guide rails. As an example, it may be possible to add secondary wear bumps in this area, to accomplish the same interference fit, or add small spring fingers to bias the guide rails 106, 108, 110 against each other in one direction.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A hinge mechanism to couple a display member and a base member of a computing device, the hinge mechanism comprising:
   a first guide rail fixed to the display member of the computing device;
   a second guide rail fixed to the base member of the computing device;
   an intermediate guide rail to connect the first guide rail and the second guide rail to each other, wherein the first guide rail and the second guide rail are concentric and fit with the intermediate guide rail and slide one with another telescopically in a circular direction; and
   a clamping bracket to hold the first guide rail, the second guide rail, and the immediate guide rail together and apply rotational friction to the hinge mechanism so that the display member and the base member can be positioned at various angles with respect to each other.

2. The hinge mechanism of claim 1, comprising additional intermediate guide rails to connect the first guide rail and the second guide rail, wherein the additional intermediate guide rails allow for the display member and the base member to be positioned at even greater angles with respect to each other.

3. The hinge mechanism of claim 1, wherein the first guide rail and the second guide rail fitting with the intermediate guide rail comprises a protrusion of one guide rail fitting into a recess in an opposing guide rail.

4. The hinge mechanism of claim 1, comprising hard stop features to prevent over rotation of the display member and the base member with respect to each other.

5. The hinge mechanism of claim 4, wherein the hard stop features comprise a notch of one guide rail coming into contact with another notch of an opposing guide rail.

6. The hinge mechanism of claim 1, comprising grease or viscous fluid to prevent material wear as the display member and the base member are rotated with respect to each other.

7. The hinge mechanism of claim 1, comprising a hinge cap to cover the first, second, and intermediate guide rails.

8. A computing device comprising:
   a display member;
   a base member; and
   a hinge mechanism to pivotally connect the display and base members, the hinge mechanism comprising:
      a first guide rail fixed to the display member;
      a second guide rail fixed to the base member;

an intermediate guide rail to connect the first guide rail and the second guide rail to each other, wherein the first guide rail and the second guide rail are concentric and fit with the intermediate guide rail and slide one with another telescopically in a circular direction; and a clamping bracket to hold the first guide rail, the second guide rail, and the immediate guide rail together and apply rotational friction to the hinge mechanism so that the display member can be positioned at various angles with respect to the base member.

9. The computing device of claim 8, comprising additional intermediate guide rails to connect the first guide rail and the second guide rail, wherein the additional intermediate guide rails allow for the display and base members to be positioned at even greater angles with respect to each other.

10. The computing device of claim 8, wherein the first guide rail and the second guide rail fitting with the intermediate guide rail comprises a protrusion of one guide rail fitting into a recess in an opposing guide rail.

11. The computing device of claim 8, comprising a hinge cap to cover the first, second, and intermediate guide rails.

\* \* \* \* \*